Nov. 8, 1949  C. C. BELL ET AL  2,487,211
RATE SMOOTHING AND MATCHING MECHANISM
FOR COMPUTING APPARATUS
Filed Aug. 4, 1943
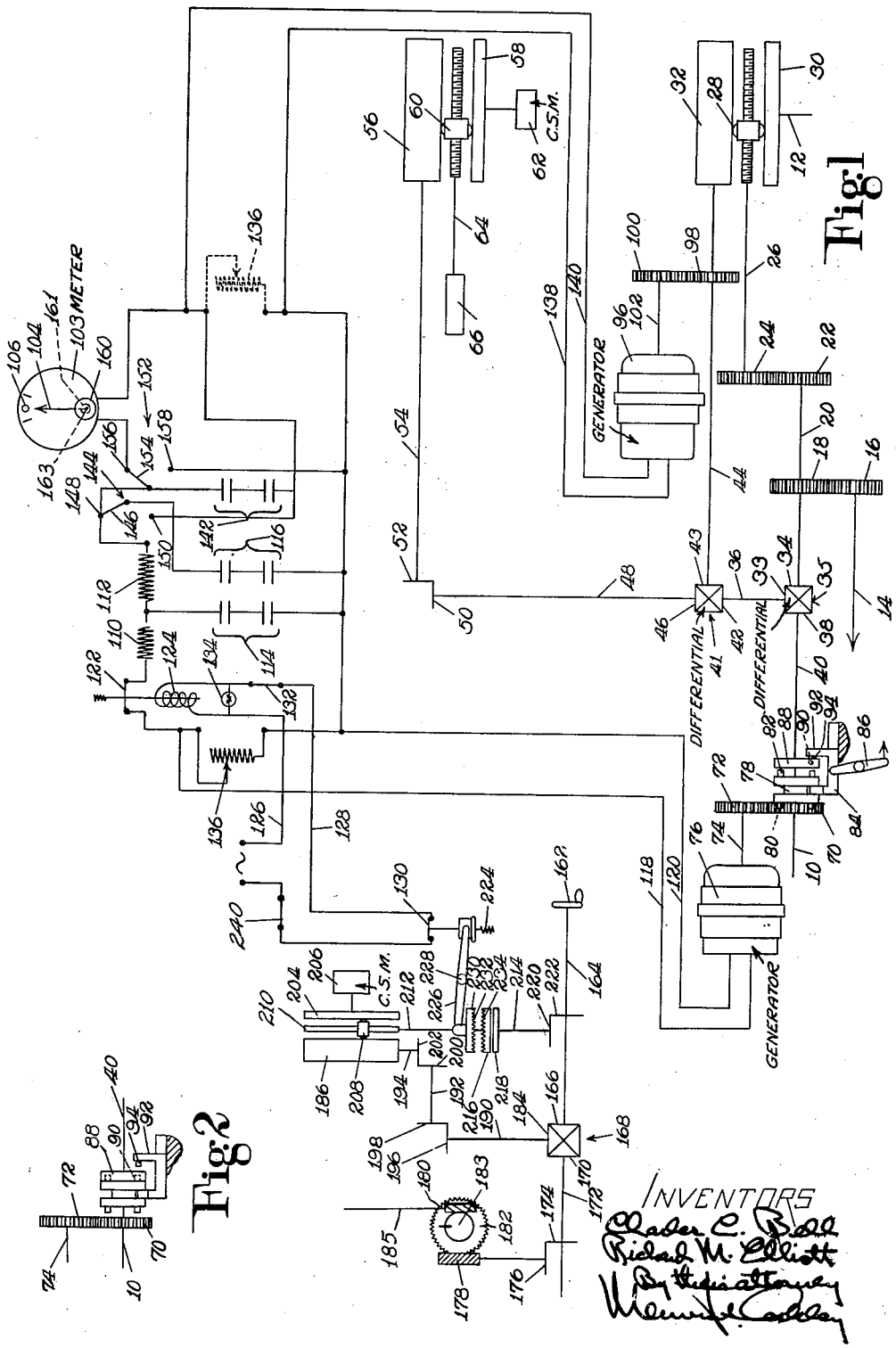

Patented Nov. 8, 1949

2,487,211

UNITED STATES PATENT OFFICE 2,487,211

RATE SMOOTHING AND MATCHING MECHANISM FOR COMPUTING APPARATUS

Charles C. Bell, Marblehead, and Richard M. Elliott, Beverly, Mass., assignors to United Shoe Machinery Corporation, Flemington, N. J., a corporation of New Jersey Application August 4, 1943, Serial No. 497,382

10 Claims. (Cl. 235—61.5)

This invention relates to apparatus for computing ordnance data and particularly to mechanism for multiplying a rate value by a time value to obtain a prediction.

In a known type of apparatus for computing ordnance data for use in directing gun fire against rapidly moving targets, such as, for example, aircraft, the present position of the target is continuously determined, with respect to rectangular (north-south and east-west) coordinates, by means of mechanism which is operated by tracking the target in azimuth and by feeding into the mechanism the present horizontal range of the target, which latter operation involves tracking of the target in elevation. This mechanism is arranged to resolve the target movement into E-W and N-S component rates, and these rates are combined with a time value, i. e., the time of flight of the shell, in so-called "prediction multipliers," to obtain a prediction of the future travel of the target with respect to the mentioned coordinates in terms of the E-W and N-S components of its movement. These component movements are utilized to operate another mechanism which has an element that continuously represents the future position of the target from which the desired ordnance data, such as angle of train, quadrant elevation and fuse value, are obtained. The United States patent to Chafee et al. No. 2,340,865 discloses an ordnance computing apparatus of the type mentioned.

In the particular form of ordnance-computing apparatus of this type with which this invention is especially concerned, and to which the herein-illustrated embodiment thereof is shown applied, the prediction multipliers comprise variable-speed drives of the disc, ball and cylinder type, see the aforementioned patent. This apparatus has means for driving the discs of each of these variable-speed drives in accordance with a time value, i. e., the reciprocal of the time of flight, and the action of each multiplier is such that when the speed of its cylinder is matched to that of a component target rate shaft, which is continuously rotated in accordance with a rate value, through the action of a differential which adjusts the positions of the balls to establish equilibrium, as explained below, the position of the balls from the center of the disc is a measure of the product of that component rate times the time of flight, i. e., the component target movement or prediction. The present position mechanism transforms the component target rates into rotations of shafts, and each component rate shaft is connected to one side of a so-called "equating differential" the other side of which is connected to the cylinder of the prediction multiplier. Movement of the carrier of the equating differential serves automatically to adjust the balls until the two side gears are rotating at the same speed, and hence the cylinder speed is matched to that of the component rate shaft. Each equating differential is connected to its associated prediction-multiplier cylinder through another differential by means of which corrections for the effect of ballistic wind may be added to the component rates in the multipliers. These component wind rates are generated by means of disc, ball and cylinder variable-speed drives the outputs of which feed into the adding differentials and may be varied by manually adjusting the ball positions.

Due to the fact that it is practically impossible for the trackers to keep on the target, they must make frequent space corrections which result in the generation of false rates by the present position mechanism. Likewise, the operator, who is setting-in present horizontal range, has to make similar range corrections. Accordingly, the component rates are not smooth but, on the contrary, are irregular, and the prediction based on such irregular rates will be erratic. A principal object of this invention is to provide means for smoothing out such irregular rates before they are matched in the prediction multipliers, so that accurate predictions will be at all times obtained. As will be apparent, the tracking errors, as well as the errors in feeding-in horizontal range to the present position mechanism, will be first in one sense and then in the other so that the net error is zero, or near zero. Thus, if the generated rate is averaged, or smoothed, the resulting rate will be the same as the true rate which would be generated with perfect tracking and perfect setting-in of present horizontal range. Hence, in accordance with a feature of this invention, the irregular component rates are smoothed, or averaged, and these smoothed rates are matched in the prediction multipliers. More particularly, and as shown in the herein illustrated embodiment of the invention, the rates are smoothed electrically by having the component rate shafts drive electric generators and passing the outputs of these generators through smoothing circuits. These smoothed voltages, which are a measure of the averaged component rates, are then balanced against voltages obtained from generators driven by the cylinders of the prediction multipliers the speeds of which may be varied manually by means of variable-speed drives. When the component rate voltages are thus balanced by the cylinder voltages, as indicated by zeroing meters, the cylinder speeds are matched to the averaged rates and a correct prediction is obtained. Conveniently, the existing wind-correcting variable-speed drives, see wind correction gears 74 and 87, Fig. 1B of the aforementioned patent, may be utilized to vary the speeds of the prediction multiplier cylinders and correction for ballistic wind may be made by suitably biasing the pointers of the zeroing meters.

As explained above, the matching of the speed of a prediction multiplier cylinder to that of a component rate shaft has been previously effected by means of a differential which translated a difference in the speeds of these two elements into an adjusting movement of the differential carrier which, in turn, shifted the balls to a point where these speeds were equalized. This involves an inherent dynamic lag since a part of the difference in the speeds to be matched is absorbed by the movement of the carrier, and the resulting prediction is always a little behind hand. To overcome this objection, the present invention provides means for directly comparing the speed of a cylinder with the speed of its respective rate shaft, together with, as above suggested, power-operated means for adjusting the position of the balls of the prediction multiplier so that, in the process of matching the speed of the cylinder to that of its component rate shaft, the rotations required to make the necessary adjustment of the balls, are automatically supplied and the dynamic lag eliminated.

Other features of this invention include the provision of means for cutting-out the smoothing circuit to prevent the entry thereinto of voltage surges which may result from large space corrections by the trackers; of means for reducing the effect of the smoothing circuit when it is desired to obtain data more quickly; of means for simultaneously cutting-out the smoothing circuit and freezing the range rate to improve predictions of the path of a target while it is obscured; and, of means for shifting from electrical operation back to mechanical operation.

These, and other, objects and features of the invention will appear in the following detailed description of the embodiment shown in the accompanying drawings and will be pointed out in the claims.

In the drawings,

Fig. 1 is a schematic drawing of apparatus embodying this invention; and

Fig. 2 is a view of a part of the apparatus shown in Fig. 1 in a different operating position.

Referring to Fig. 1, 10 designates a shaft which is rotated in accordance with a component rate by means of mechanism, not shown and forming part of the director with which the illustrated apparatus is associated, see drafts 71 and 95, driven by slides 36 and 48, respectively, of resolving mechanism 22, Figs. 1A and 1B of the aforementioned patent, 12 is a shaft which is driven at a speed proportional to the reciprocal of the time of flight, while 14 designates a shaft the rotations of which are to represent the product of the component rate times the time of flight, i. e., the component prediction, see shafts 65 and 91, Fig. 1B of the aforementioned patent. Shaft 14 is driven, through gears 16, 18, shaft 20, gears 22, 24, by shaft 26, the rotations of which adjust the position of the balls 28 of a variable-speed drive having a disc 30, driven by the shaft 12, and a cylinder 32. The shaft 20 is connected to the side gear 34 of a differential 35, and the carrier 33 of this differential drives a shaft 36 while its other side gear 38 is connected to a shaft 40. The shaft 36 is connected to one side gear 42 of a second differential 41, the carrier 43 of which is driven by a shaft 44 that extends from the cylinder 32.

As will be understood by those skilled in the art, and as explained in the aforementioned patent, see page 4, column 1, lines 24–48 inclusive, the variable-speed drive, comprising disc 30, balls 28 and cylinder 32, will operate as a reciprocal multiplier so that the amount of rotation of shaft 26, necessary to establish equilibrium, i. e., to position the balls at that point on the disc which has a surface speed equal to the peripheral speed of the cylinder, will be proportional to the product of the speed of rotation of the cylinder 32 times the reciprocal of the speed of rotation of the disc at that instant. Hence, if the disc is rotated at a speed proportional to the reciprocal of the time of flight, and the cylinder is rotated at a speed proportional to the component rate, as received by shaft 10, when equilibrium has been established, the displacement of the balls from the center of the disc, and the angular displacement of the shaft 14, will represent the product of the component rate and time of flight at that instant. The balls 28 will be automatically moved to a position of equilibrium by the action of the differential 41 in a manner which will presently appear.

The second side gear 46 of the differential 41 is connected to a shaft 48 which is driven, through gears 50, 52, by a shaft 54 extending from the cylinder 56 of a variable-speed drive having a disc 58 and balls 60. The disc 58 is driven by a constant-speed motor 62, and an adjusting shaft 64, having a hand knob 66, is provided for displacing the balls 60 to vary the speed of shaft 48. If the balls 28, of the first-mentioned variable speed drive, are so positioned that cylinder 32 and shaft 44 are rotating at the same speed as shaft 48, at any instant, shaft 36, which registers the difference between the speeds of these two shafts, will remain stationary. However, if this state of equilibrium is disturbed, as by a change in the speed of disc 30, for example, shaft 36 will be caused to rotate. This rotation will be transmitted to shaft 26 through differential 35, which acts merely as a reversing gear since, as will appear below, outside gear 38 is locked against turning, shaft 20, and gears 22, 24 to reposition the balls 28 and will continue until equilibrium is again established. The same action will occur with a change in the speed of rotation of the shaft 48.

The speed of rotation of the shaft 44 is directly matched to the speed of rotation of shaft 10, by means to be subsequently described, so that the amount of rotation of shaft 14 will be proportional to the product of the component rate (shaft 10) times the time of flight (shaft 12), in the following manner. Rotatably mounted, but held against axial movement, on the shaft 10 is a gear 70 which, through another gear 72 and shaft 74, drives a direct current generator 76. Splined to the shaft 10 is a clutch element 78 having two sets of dogs 80 and 82 and engaged by a shifting yoke 84 operated by a lever 86. The shaft 40 is in line with shaft 10 and carries a disc 88 provided with an axial hole 90. The shifting yoke has an upturned end 92 provided with a pin 94, Fig. 2. With the parts in the position shown in Fig. 1, the shaft 10 is clutched to the gear 70, so as to drive the generator 76, and pin 94 is in the hole 90, thus holding shaft 40 and the side gear 38 of differential 35 against rotation. Shaft 44 drives a second direct current generator 96, through gears 98, 100 and shaft 102. The outputs of these two generators are balanced in a zeroing microammeter 103 having a pointer 104 and a zero mark 106. The operator can keep the speed of shaft 44 matched, directly and continuously, to the speed of shaft 10 by so manipulating the knob 66 that the pointer 104 remains opposite to the zero mark 106.

As has been explained above, the balls 28 are automatically positioned, to establish equilibrium between the speeds of shafts 48 and 44 and to give the prediction, by the rotation of the shaft 36 which drives the adjusting shaft 26. With the carrier gear 43, of the differential 41 driven by the shaft 44 and shafts 36 and 48 connected to the two side gears of this differential, such rotations of the shaft 36 represent the difference between the rotations of shafts 48 and 44. Thus, when a change in prediction is being made, shaft 48 will turn somewhat slower or faster than shaft 44, depending on the direction of such change, in order to effect rotation of shaft 36 in the proper direction. With the generator 96 driven directly from shaft 44, these differences in rotation between shafts 44 and 48, during a change in prediction, are fed into the apparatus from the constant-speed motor 62 as the operator adjusts the balls 60 to keep the meter 103 zeroed. Accordingly, there is no dynamic lag in the prediction, as would be the case if the speed of shaft 48 were to be matched to the speed of shaft 10, or as in the case where shaft 40 is connected to the shaft 10 and the speed of shaft 44 matched, through the action of differential 35, to that of shaft 40.

The component rate, carried by the shaft 10, is generated by mechanism forming part of the director proper, as the result of the tracking of the target by the azimuth and elevation trackers and the feeding of present horizontal range into the director by a range setter, see the aforementioned patent to Chafee et al., lines 30–55, col. II, page 1, and lines 1–23, col. I, page 2. In feeding-in present horizontal range, the range-rate setter has to follow either a dial which is rotated in accordance with present horizontal range, as received from a height finder, or a dial which is rotated in accordance with present angular target height, as indicated by an elevation tracking telescope, see indicators 9 and 9', Fig. 1A of the aforementioned patent. Since neither the target tracking or dial matching can be done perfectly, the operators must be continuously making slight corrections to get on the target and to match the dial. These correcting movements put false values into the rate-generating mechanisms with the result that the rates generated thereby are erratic, the errors being now on one side and then on the other side of the correct rate.

In our improved apparatus, we provide means for smoothing out these erraticisms in the generated rates by obtaining an averaged, or smoothed, rate which is matched in the prediction multipliers. The output generator 76, which, as has already been explained, is driven by a component rate shaft 10, is smoothed by means of a conventional type of smoothing circuit comprising resistances 110 and 112 and capacitances 114 and 116. Leads 118, 120 connect generator 76 to this circuit through a switch 122 operated by a solenoid 124. This solenoid is energized, to hold the switch 122 in closed position, from a power source, as shown, the leads 126, 128 from the solenoid including two switches 130, 132 both of which are normally closed. A signal light 134 is connected across the leads 126, 128 to indicate when the switch 122 is closed and the smoothing circuit in operation. To compensate for slight differences between the generating rates of the two generators 76 and 96, a variable resistance 136 is provided together with suitable leads and a switch, not shown, for selectively shunting the leads 118, 120 from the generator 76, by placing the variable resistances across these leads, as shown in full lines, or for shunting leads 138, 140, from generator 96, as shown in dotted lines. It will be understood that, by means of the variable resistance, a portion of the generated voltage of the one of the two generators having the higher voltage may be shunted to bring its net voltage down to exactly the same value as that of the other generator when they are both driven at the same speed. When this has been done, a zero reading of the meter 103 will indicate that shaft 44 is rotating at a speed which is exactly matched to the smoothed and averaged speed of the component rate shaft 10. A third bank of condensers 142 is provided for smoothing out the commutator ripple in the generator 96.

A single-pole, double-throw switch 144, including an arm 146 and two contacts 148, 150, is interposed at the output side of the smoothing circuit. When the arm is on contact 148, the smoothing circuit is operative to smooth the irregular voltage generated by the generator 76, and this is the normal position of this switch. However, if it is desired to obtain a prediction more quickly, the arm may be placed on contact 150, in which position there will be much less smoothing, and the operator must mentally average the irregular rate. This position of the switch also provides a means for calibrating the circuit without waiting very long for the condensers to charge. There is also another single-pole, double-throw switch 152, having an arm 154 and two contacts 156, 158, interposed at the output side of the smoothing circuit. This switch is used for adjusting the meter 103 for different conditions of ballistic wind. If there is no ballistic wind correction to be made, the switch 152 is placed in the "off" position, arm 154 on contact 158, and the needle is adjusted to zero by means of a conventional biasing knob 160 which may be pushed in and turned in the proper direction to so position the needle-centering spring 161, one end of which is connected to the needle shaft 163 and the other to the knob 160, as to bring the needle to zero with no voltage across the meter terminals. When it becomes necessary to set-in a ballistic wind rate to offset a ballistic wind component, the switch 152 is placed in its normal "on" position, as shown, arm 154 on contact 156, and an appropriate wind rate is set in by adjusting the knob 66. The meter is now biased to zero, by means of the knob 160 which acts through a spring, not shown, to hold the needle 104 on the zero mark 106 against the action of the applied voltage. With the meter thus biased, this ballistic wind component value is automatically accounted for, since the rate matcher, in adjusting knob 66 so as to keep the meter 103 zeroed, balances the voltage from the generator 76, generated by the component target rate, against the voltage from generator 96 and the bias of the meter. As previously pointed out, directors of the type to which this invention relates are provided with variable-speed drives for setting-up component ballistic wind rates and these may be used for driving the shaft 54. The adjusting knobs of these drives are provided with suitable dials for setting-in component wind rates and hence may be conveniently employed with the present apparatus without change.

As has already been explained, the rate that is carried by shaft 10 is generated by mechanism the operation of which is affected by the azimuth and elevation trackers and also by the range-rate setter. As will be obvious, if the azimuth tracker gets off the target and has to get back on quickly or, if the range-rate setter has to make a correction, due to a change in the elevation angle or altitude setting, false rates will be set up, and a surge in the voltage generated by generator 76 will be introduced into the smoothing circuit. The same result will be experienced when the whole director is being slewed. To prevent these false rates from being set into the prediction multiplier and these surges in voltage from entering the smoothing circuit, the switches 130, 132 and signal light 134 are employed. When either of these switches is opened, switch 130 being operated by the range setter and switch 132 by the battery commander, or possibly by the elevation or azimuth tracker, the switch 122 will be opened, thus cutting off the smoothing circuit from the component rate generator 76 and keeping out voltage surges. At the same time, the signal light 134 will go out, thus notifying the rate matchers to cease their adjustments. The prediction multiplier continues to function with the rate as previously set-in. If a surge in voltage should accidentally be set up in the smoothing circuit, the charge can be removed by placing switch 144 in its normal position, arm 146 on contact 148, and switch 152 in its off position, arm 154 on contact 158, momentarily. This short-circuits the condensers and dispels the charge.

Present horizontal range is set into the director by means of a hand wheel 162 carried by a shaft 164 which drives a side gear 166 of a differential 168. The other side gear 170 of this differential is connected to a shaft 172 which carries present horizontal range to the rate-generating mechanism of the director. The shaft 172 also drives, by means of gears 174, 176, shaft 178 and worm 180, a dial 182 which the range-rate setter must keep matched with an inner dial 183, rotated by shaft 185 which may be driven in accordance with either present horizontal range, as received from a height finder or with present angular target height, as in the aforementioned patent. To provide for aided tracking, the carrier gear 184, of the differential 168, is arranged to be driven from the cylinder 186 of a variable-speed drive by means of shafts 190, 192, 194 and gears 196, 198, 200, 202. This variable-speed drive has a disc 204, driven by a constant-speed motor 206, and a ball carriage 208 which is displaceable by means of a screw 210 from which a shaft 212 extends. This shaft is connected to a shaft 214 by means of a slip clutch including an element 216, fixed to shaft 212, and another element 218 carried by the shaft 214. This slip-clutch is shown diagrammatically but it is to be understood that the parts 216, 218 have opposed friction surfaces which are pressed together by resilient means, not shown, so that rotation of shaft 214 is transmitted to shaft 212 unless, as explained below, the element 216 is prevented from rotating. Shaft 214 has a gear 220 which meshes with a gear 222 fixed to shaft 164. The construction just described is a part of the director and enables the range-rate setter quickly to match the marks on dials 182 and 183 and to keep them matched by the aided tracking action obtained as will be readily understood by those skilled in the art.

The range-rate setter also has direct control over the smoothing circuit through switch 130 which he may open, against the action of a spring 224, by means of a lever 226. This lever is pivoted at 228. One end of this lever is pivotally connected to a non-rotatable disc 230, through which shaft 212 passes loosely. The non-rotatable disc 230 and clutch element 218, which is fixed to shaft 212 have serrations 232, 234 on their opposed faces. Accordingly, when the lever is operated to open switch 130, shaft 212 is locked against rotation and the range rate is "frozen" at the value last set in. Thus, when the range setter makes a range space correction, i. e., turns handle 162 rapidly to bring the marks on dials 182 and 183 together, he first operates lever 226. This not only freezes-in the previous rate but also cuts-out the smoothing circuit and puts out the signal light. As soon as he gets the dials matched, he releases the lever 226. This cuts-in the smoothing circuit, the signal light goes on and the rate setters resume their adjustments. The range-rate setter will also operate the lever 226 whenever a tracker calls, "off target," thus cutting off the resulting surge in getting back on the target. For example, when the target enters a cloud, the trackers will call, "off target," or "target obscured," the range-rate setter will immediately operate the lever 226 and all will continue tracking except the rate setters, the signal light now being out, who have established the rate at the time the target entered the cloud. This rate will probably be correct even with the target obscured, and the only error in firing will result from wrong space positioning, which will be small for a reasonably small cloud. The prediction motors of the director will continue to run all the time, but the prediction values will not suffer from rate errors.

When it is desired to eliminate the electrical rate smoothing and change over to mechanical operation, the clutch element 78 is moved to the position shown in Fig. 2. The gear 70, and generator 76, are now disconnected from the shaft 10 and this shaft is coupled to shaft 40. The power is cut-off from lines 126 and 128 by means of a switch 240 which breaks the electrical circuit and turns out the signal light 134. Switch 152 is turned to its off position, thus removing the meter 103 from the circuit. Knob 66 is now adjusted to the proper wind setting, and the apparatus is ready for mechanical operation. Under mechanical operation, the component rate carried by shaft 40 is automatically matched to shaft 44 by the action of differential 35 which translates any difference between the rotations of these two shafts into a rotation of shaft 20 and an adjustment of the balls 28 to establish equilibrium, this rotation of shaft 20 representing, as before, the product of the rate, rotations of the shaft 44, and time of flight. The correction for ballistic wind is set in through differential 46 and thus added (algebraically) to the rotations of shaft 44. The switch 240 for cutting-off the power supply, mentioned above, is also arranged, through appropriate electrical connections, not shown, to place the switches 130 and 132 in the line to the prediction follow-up motors of the director, see motors 52 and 55 of the aforementioned patent. These switches may now be used to stop the prediction motors when the trackers are getting on the target or when altitude or range corrections are being made which would result in false rates and erroneous predictions.

It will be understood, of course, that the apparatus just described is duplicated in the director for handling another set of component target rates and for obtaining another set of predictions, one operating on E-W components and the other on N-S components. Conveniently, the two zeroing meters may be located side by side so that only one rate setter will be required. Also the electrical circuits can be combined so that but one power switch, one set of switches 130 and 132, one switch 144 and one switch 152, can be used to control both of the smoothing circuits.

Having thus described our invention, what we claim as new and desire to secure by United States Letters Patent is:

1. In a computing apparatus having mechanism for combining a rate value with a time value, said mechanism comprising a cylinder to be rotated in accordance with the rate value, a disc, means for rotating the disc in accordance with the time value, means for driving the cylinder from the disc, and means including a rotatable adjusting shaft for varying the speed ratio of the drive from the disc to the cylinder, the combination with said mechanism of a shaft which is continuously rotated in accordance with the rate value, means for comparing directly the speeds of the cylinder and rate shaft, a differential having three elements, one connected to the cylinder, another connected to the adjusting shaft, and means for driving the third element of the differential in accordance with differences between said speeds to effect a rotation of the adjusting shaft and thereby to keep the speed of the cylinder matched to that of the rate shaft.

2. In a computing apparatus having mechanism for combining a rate value with a time value, said mechanism comprising a cylinder to be rotated in accordance with the rate value, a disc, means for rotating the disc in accordance with the time value, means for driving the cylinder from the disc, and means including a rotatable adjusting shaft for varying the speed ratio of the drive from the disc to the cylinder, the combination with said mechanism of a shaft which is continuously rotated in accordance with the rate value, means for comparing directly the speeds of the cylinder and rate shaft, a differential having three elements, one connected to the cylinder, another connected to the adjusting shaft, and power-operated means for driving the third element of the differential in accordance with differences between said speeds to effect a rotation of the adjusting shaft and thereby to keep the speed of the cylinder matched to that of the rate shaft.

3. In a computing apparatus having mechanism for combining a rate value with a time value, said mechanism comprising a member to be moved in accordance with said rate value and a second member which is continuously moved approximately in accordance with said rate value but with deviations therefrom such that the average rate of movement is substantially in accordance with said value, the combination with said members of means for moving said first-named member at different speeds selectively, electrical generators driven by said first member and said second member, respectively, means for smoothing the voltage of the generator driven by said second member, and means for comparing this smoothed voltage with the voltage of the other generator to determine when the speed of movement of the first member is matched with the average speed of movement of the second member.

4. In a computing apparatus having mechanism for combining a rate value with a time value, said mechanism comprising a cylinder to be rotated in accordance with the rate value, a disc, means for rotating the disk in accordance with the time value, means for driving the cylinder from the disc, and means including a rotatable adjusting shaft for varying the speed ratio of the drive from the disc to the cylinder, the combination with said mechanism of a shaft which is continuously rotated in accordance with the rate value, electrical generators driven by said cylinder and said rate shaft, respectively, means for comparing the voltages of said generators to determine when the speeds of the cylinder and said rate shaft are the same, a differential having a carrier driven by the cylinder, and two side gears, means for connecting one of the side gears to the adjusting shaft, and means for rotating the other side gear of the differential to effect, through said differential, a rotation of the adjusting shaft and thereby to keep the speed of the cylinder matched to the speed of the rate shaft.

5. In a computing apparatus having mechanism for combining values, said mechanism comprising a shaft to be rotated in accordance with one of said values, a second shaft which is continuously rotated approximately in accordance with said one value but with deviations therefrom such that its average speed is substantially in accordance with said value, and means for selectively rotating the first-named shaft at different speeds, the combination with said mechanism of electrical generators driven by said first shaft and said second shaft, respectively, means for smoothing the voltage of the generator driven by said second shaft, means for comparing this smoothed voltage with the voltage of the other generator to indicate when the speed of the first shaft is matched to the average speed of said second shaft, means for rendering the smoothing means and voltage comparing means inoperative, and means for indicating when said smoothing means and said comparing means are inoperative.

6. In a computing apparatus having mechanism for combining a rate value with a time value, said mechanism comprising a member to be moved in accordance with said rate value, a second member which is continuously moved approximately in accordance with said rate value but with deviations therefrom such that the average rate of movement is substantially in accordance with said value and means for moving said first-named member at different speeds selectively, the combination with said mechanism of electrical generators driven by said first member and said second member, respectively, means for smoothing the voltage of the generator driven by said second member, means for comparing this smoothed voltage with the voltage of the other generator to determine when the speed of movement of the first member is matched to the average speed of movement of the second member, and means for reducing the effect of said smoothing means.

7. An ordnance computing apparatus having a range-rate mechanism for setting-in range value and mechanism for combining a target-rate value with a time-of-flight value which is a function of the range value at any instant, the last-named mechanism comprising a shaft to be rotated in accordance with said target-rate value, a second shaft which is continuously rotated approximately in accordance with said target-rate value but with deviations therefrom such that its average speed of rotation is substantially in accordance with said target-rate value, and means for selectively rotating the first-named shaft at different speeds, the combination of electrical generators driven by said first shaft and said second shaft, respectively, means for smoothing the voltage of the generator driven by said second-named shaft, means for comparing this smoothed voltage with the voltage of the other generator to determine when the speed of rotation of the first shaft is matched to the average speed of rotation of said second shaft, and means for simultaneously rendering said smoothing means inoperative and freezing the output of said range rate mechanism.

8. In a computing apparatus having a mechanism for combining values, said mechanism comprising a first shaft to be rotated in accordance with the said one value, a second shaft which is continuously rotated in accordance with the other of said values, and means including a rotatable adjusting shaft for varying the speed of rotation of the first-named shaft, the combination with said mechanism of means for determining when the speed of the first shaft is matched to the speed of the second shaft including an electrical generator, a differential having a carrier driven by the first shaft and two side gears, means for connecting one of the side gears to the carrier of a second differential one side gear of which drives the adjusting shaft, means for rotating the other side gear of the first differential, and clutch means for connecting the second-named shaft to the generator, said clutch means being adapted also to hold the other side gear of said second differential against rotation when said second-named shaft is connected to said generator.

9. In a computing apparatus having mechanism for combining a rate value with a time value, said mechanism comprising a cylinder to be rotated in accordance with the rate value, a disc, means for rotating the disk in accordance with the time value, means for driving the cylinder from the disc and means for varying the speed ratio of the drive from the disc to the cylinder including a rotatable adjusting shaft, the combination with said mechanism of a shaft which is continuously rotated in accordance with the rate value, electrical generators driven by said cylinder and said rate shaft, respectively, means for comparing the voltages of said generators to determine when the speeds of the cylinder and rate shaft are the same, a differential having a carrier driven by the cylinder and two side gears, means for connecting one of the side gears to the carrier of a second differential one side gear of which drives the adjusting shaft, means for rotating the other side gear of the first differential, and clutch means for connecting the rate shaft to one of the generators.

10. In a computing apparatus having mechanism for combining a rate value with a time value, said mechanism comprising a cylinder to be rotated in accordance with the rate value, a disc, means for rotating the disc in accordance with the time value, means for driving the cylinder from the disc and means for varying the speed ratio of the drive from the disc to the cylinder including a rotatable adjusting shaft, the combination with said mechanism of a shaft which is continuously rotated in accordance with the rate value, electrical generators driven by said cylinder and said rate shaft, respectively, means for comparing the voltages of said generators to determine when the speeds of the cylinder and rate shaft are the same, a differential having a carrier driven by the cylinder and two side gears, means for connecting one of the side gears to the carrier of a second differential one side gear of which drives the adjusting shaft, manually controlled, power-operated means for rotating the other side gear of the first differential, and clutch means for connecting the rate shaft to one of the generators.

CHARLES C. BELL.
RICHARD M. ELLIOTT.

REFERENCES CITED

The following references are of record in the file of this patent:

UNITED STATES PATENTS

| Number | Name | Date |
|---|---|---|
| 706,554 | Hall | Aug. 12, 1902 |
| 1,629,236 | Sperry | May 17, 1927 |
| 1,686,638 | Pierce | Oct. 9, 1928 |
| 1,990,577 | Watson | Feb. 12, 1935 |
| 2,153,264 | McNeil | Apr. 4, 1939 |
| 2,205,330 | Allen | June 18, 1940 |
| 2,206,875 | Chafee et al. | July 9, 1940 |
| 2,329,216 | Peters | Sept. 14, 1943 |
| 2,333,605 | Watson | Nov. 2, 1943 |
| 2,340,865 | Chafee et al. | Feb. 8, 1944 |